(No Model.)

F. W. MOSELEY.
COMPOUND FAUCET.

No. 306,168. Patented Oct. 7, 1884.

Witnesses:
L. C. Hills
Wm. S. Duvall

Inventor:
Fredrick W. Moseley
By E. B. Stocking
Atty.

UNITED STATES PATENT OFFICE.

FREDRICK W. MOSELEY, OF POULTNEY, VERMONT.

COMPOUND FAUCET.

SPECIFICATION forming part of Letters Patent No. 306,168, dated October 7, 1884.

Application filed February 16, 1884. (No model.)

*To all whom it may concern:*

Be it known that I, FREDRICK W. MOSELEY, a citizen of the United States, residing at Poultney, in the county of Rutland and State of Vermont, have invented certain new and useful Improvements in Compound Faucets, of which the following is a specification, reference being had therein to the accompanying drawings.

The object of my invention is to provide means for the withdrawal of liquids of different specific gravity when contained in one vessel, which means shall comprise a single discharge-passage and such an arrangement of conduits thereto as shall permit the selection at will of either liquid to be drawn from the vessel.

The arrangement and construction of the elements herein shown are applicable to the separate withdrawal of oil and water in oil distillation, milk and cream and whey and curd in dairy apparatus, and all liquids and any sediments therein in all arts requiring the separation of these substances without undue agitation.

My invention is also applicable to the withdrawal of liquids through a single discharge-passage when contained in different vessels or in different compartments of a single vessel.

Other objects and advantages will appear as results of the invention in the following description thereof, and its novel features will be specifically set forth in the claims.

Figure 1:
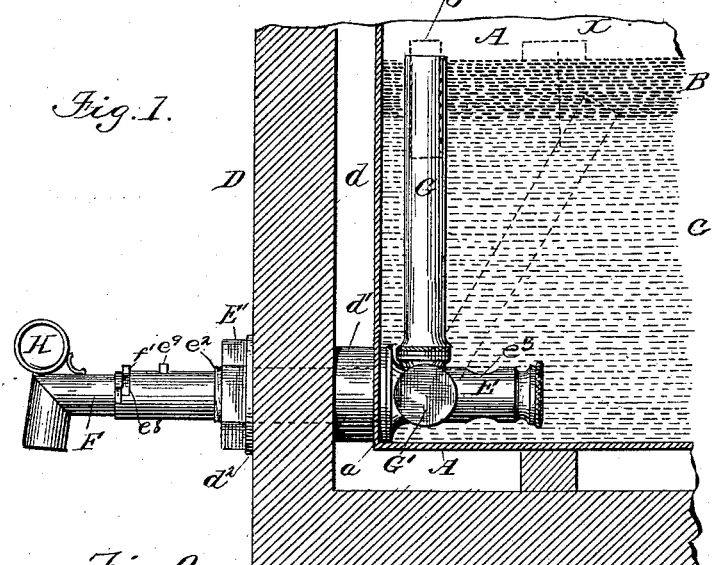
Figure 2:
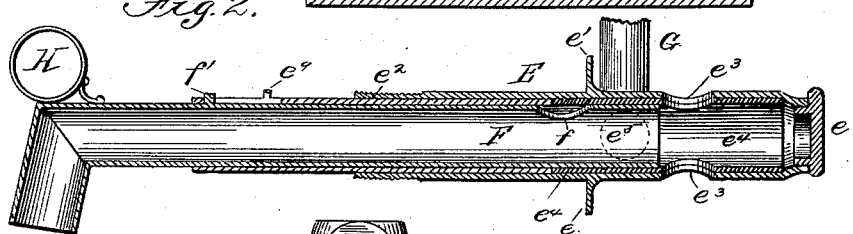
Figures 3, 4:
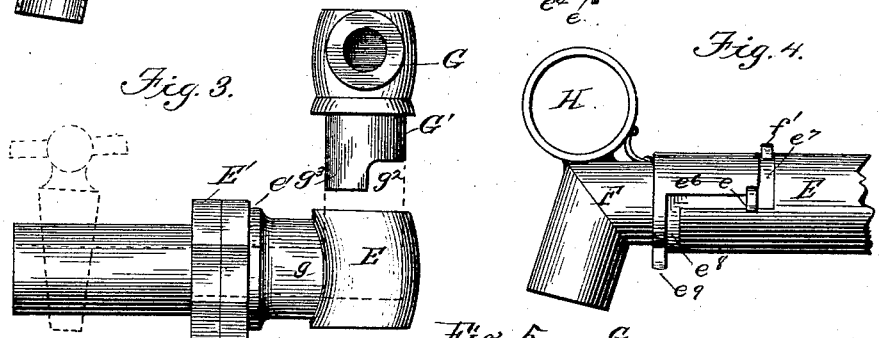
Figure 5:
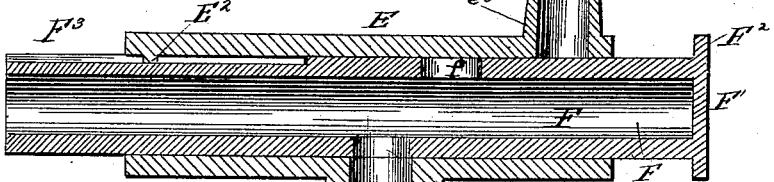
Figure 6:
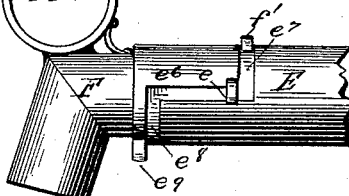

In the drawings, Figure 1 is a side elevation of a compound faucet and certain adjuncts thereto, the whole constructed in accordance with my invention, and illustrated as attached in operative position to a jacketed vessel, a portion only of which is shown. Fig. 2 is a central vertical section of the faucet complete. Fig. 3 is a plan of my surface-drainage tube, showing one form of connection with the discharge-tube, whereby the former acts as and performs the functions of a stop-cock. Fig. 4 is a plan of the outer end of the discharge-tube when turned to a horizontal position, for a purpose hereinafter stated. Fig. 5 is a modified form of a discharge-tube, and Fig. 6 a modified connection of the surface-drainage tube to the faucet proper.

Like letters indicate similar parts in all the figures.

In the designed control of liquids of the class specified there are two strata, an upper and a lower, and in some instances there may be more, in accordance with the specific gravity of each; and although I do not wish to be understood as limiting myself to the use of my invention to any single art requiring the separation of liquids, I herein illustrate the operation of the same in connection with the independent withdrawal at will of milk and cream from a single vessel.

To render the application of my invention to the withdrawal of any liquids from separate vessels, or from separate compartments of one vessel, it is only required that separate ports, entrances into, or conduits to the discharge-tube shall have any well-known means of independent communication with said vessels or compartments.

A represents a can, tank, or other vessel containing any liquids of differing specific gravities, as cream (represented by the heavier dotted lines B) and milk, (represented by the lighter dotted lines C.) In this instance I have illustrated the can, tank, or vessel A as arranged in a jacket or other tank or vessel, D, which is larger than the vessel A, so as to provide an intervening space, $d$, whereby heating or cooling agents may be employed for conducting any desired process upon the liquid contained in the vessel A, to facilitate or produce the separation thereof or sustain the same in different strata.

The selection of milk and cream as the liquid to be separated and separately withdrawn not only serves as a means of illustrating my invention, but also shows its applicability to advantageous use in milk-depots, hotels, and restaurants, where milk and cream are dispensed in small quantities, as well as its use in dairies where the Swedish method of treating milk for the rapid production of cream is practiced.

It is apparent that the jacket or outer tank, D, may be dispensed with, and also the usual spacing block or packing, $d'$, as they are not essential adjuncts, and I do not limit my invention to a use of the same in connection with such adjuncts.

My invention involves means for low drainage and surface-drainage from the vessel A, the former comprising a discharge-tube, E, and a sliding and turning discharge-nozzle, F, arranged therein, and the latter a surface-drainage pipe, G, connected to the discharge-tube.

Figs. 1, 2, and 4 illustrate in detail one form of construction of a discharge tube and nozzle, in which the inner end of the tube E is closed with a screw-cap, $e$, and a circumferential flange, $e'$, is formed on the tube to abut against the inner surface of a wall of the can A, between which flange and wall any suitable packing, $a$, may be placed. In this instance the tube is elongated to extend through the space-packing $d'$ and the wall of the tank D, where a nut, E', is mounted upon a threaded portion, $e^2$, of the tube, and any suitable packing, $d^2$, may be interposed between the nut and wall, so that by turning the nut the parts are firmly bound together to prevent leakage. Low-drainage ports $e^3$ are formed in the tube E, and in this instance, although not essential, interior packing, $e^4$, is employed. The discharge-nozzle F is a tube open at both ends, adapted to snugly fit the tube E, and provided with a port, $f$, near its inner end. A port, $e^5$, (see dotted lines, Fig. 2,) is formed in the tube E, to communicate with a branch, G', which communicates with the pipe G, and is provided with a port, $g$, (see dotted lines, Fig. 6,) for that purpose, while its end is closed with or by a screw-cap, $g'$. This connection of the pipe G with the discharge-tube may be modified, as shown in Fig. 3, wherein the branch is formed as a part of the tube G, and is cut away, as at $g^2$, so that the portion remaining at $g^3$ may be turned across the bore of the tube E, and thus prevent the passage of liquid from the upper portion of the vessel through the pipe G and tube E so long as said pipe is in an upright position, and so that when the cut-away portion $g^2$ is brought opposite said bore by inclining said pipe, as shown by dotted lines, Fig. 1, liquid may pass through the pipe G and tube E. It will be noticed that in both constructions of the connection of the pipe G to the tube E the former is adapted to be inclined in a plane parallel with the discharge-tube—an advantage of importance where the can or vessel A is long and narrow and the discharge-tube is connected therewith at an end, because the pipe can be inclined to a lower point than if arranged to incline transversely of the can and to the plane of the tube, so that an entire and complete surface-drainage at all heights of liquids in the vessel is accomplished.

The surface-drainage being produced as above stated, the low drainage or withdrawal of liquid is effected in the following manner: The pipe G is turned to an upright position, or, in the construction shown in Fig. 2, it may be inclined or upright, when, by drawing out the discharge-nozzle F until its inner open end passes the ports $e^3$, as clearly shown in Fig. 2, the port $e^5$ will be closed, and the port or ports $e^3$ will be open, and the lower strata of liquid may be withdrawn through the discharge-nozzle F. By pushing the discharge-nozzle inward until its open end passes beyond the ports $e^3$, and turning it to the left so that it assumes a horizontal position, as shown in Fig. 4, said ports and the ports $e^5$ are closed, and neither surface nor low drainage can take place. In order to determine the limits of these movements of the discharge-nozzle, I have in this instance made use of the bayonet-slot construction shown. An extension, $e^2$, of the discharge-tube E is made beyond its screw-threaded portion—it may be integrally or by the insertion of another tube—and in said extension I form a longitudinal slot, $e^6$, and circumferential slots $e^7$ $e^8$ at its ends. The discharge-nozzle is provided with a lug, $f'$, arranged to project into said slots, the latter one of which is continued completely to the end of the extension, so that the discharge-nozzle may be entirely withdrawn from the tube E for cleaning or other purposes. Bridges $e^9$ serve to strengthen the extension at points where it is weakened by the intersection of one slot with another and with the end edges of said extension. It will be observed that when the lug $f'$ is at the lowest point in slot $e^7$ all the ports are closed. When said lug is at the highest point in said slot $e^7$, surface-drainage takes place, provided the pipe G is inclined or otherwise reaches to a point below the upper surface of the upper stratum, and when said lug is at the outer end of the slot $e^6$ the low drainage takes place, and, finally, when said lug is at the lowest point of the slot $e^8$, the discharge-nozzle may be removed.

It is common in the arts of controlling the flow of liquids to place upon the liquid in the tank a board or hollow ball, or any other floating body, which is called a "float," and to connect by flexible means or otherwise with said float a discharge-pipe which is capable of being raised or lowered at its entrance end, so that as the liquid is drawn from the vessel through said discharge-pipe the float upon the surface of the liquid falls with the liquid and allows the discharge-pipe to be depressed at the same time, so that said end of the discharge-pipe is always maintained at a uniform distance from the upper surface of the liquid in the tank or vessel.

Now, referring to Fig. 1, the dotted lines show the surface-drainage pipe inclined, so as to present its entrance or upper end within the upper stratum of the liquid in the vessel A. Now if a float, as X, (shown in dotted lines in said figure,) be connected to said upper end of the surface-drainage pipe by any means which shall maintain the said end within the upper stratum, no matter how much of the lower stratum is withdrawn from the vessel the discharge-pipe will yet remain in the upper stratum.

If the pipe G is continuously inclined, which may be accomplished by suspending its free end from any well-known float, as X, (dotted lines, Fig. 1,) a change of drainage from surface to low, or vice versa, may be quickly accomplished by moving the nozzle so as to change the position of its lug $f'$ from one end to the other of the longitudinal slot.

By reference to Fig. 2 it will be seen that when the discharge-nozzle E is withdrawn outwardly the ports $E^3$ are opened, while the port $E^5$, leading to the surface-drainage pipe, is closed, so that liquid from the lower stratum has free passage from the vessel out of the discharge-nozzle, and by pushing the discharge-nozzle inwardly the said ports $E^3$ and $E^5$ are closed, and liquid from neither stratum can be drawn; but when pushed inwardly and partially rotated, the port $E^5$ is opened, and hence liquid from the upper stratum alone is drawn—that is to say, were the upper end of the surface-drainage pipe automatically held within the upper stratum by a float only, the movements of the discharge-nozzle above described are required to draw liquid from either stratum, and these movements, by practice, may be quickly performed.

In Fig. 5 I have illustrated a discharge-nozzle constructed with a closed inner end, F', and adapted to be introduced into the tube E from the inside of the can or vessel, and provided with flanges $F^2$, to determine the outward movement of the nozzle, and a longitudinal groove, $F^3$, into which a lug, $E^2$, formed on the tube E projects, whereby said nozzle may be moved so as to bring its ports $f$ in register with either the port $e^5$ or $e^3$ of the tube E, for surface or low drainage, respectively, or to close both by drawing the nozzle outwardly until the flange $F^2$ abuts against the end of the tube E.

If desired, any well-known telescopic surface-drainage tube or pipe (see dotted lines, Y, Fig. 1) may be substituted for the pivoted pipe herein shown, and I do not, therefore, limit my invention to either form, and I may vary the proportion and detail construction of the elements herein shown in any manner and to any extent within the skill of persons conversant with the manufacture of devices of this class. For example, I may dispense with the branch G' and connect the pipe G pivotally to the inner end of the discharge-tube. I may or may not use an ornamental or other handle, H, upon the discharge-nozzle, or I may use none, and, as hereinbefore stated, the branch G' may enter the discharge-tube, and by being removable therefrom, so as to expose a port, as $g^2$, low drainage may be accomplished by such means instead of ports in the discharge-tube beyond the point of connection therewith of the surface-drainage pipe. This will be clearly understood by reference to Fig. 3, to which any ordinary faucet or plug may be added, so as to secure control of the flow of liquid entering at either end of the surface-drainage pipe.

Certain features herein shown and described are not claimed, as they are made the subject of claims in a separate application pending herewith.

Having described my invention and its operation, what I claim is—

1. A compound faucet comprising a discharge-tube and a longitudinally-movable discharge-nozzle having ports or openings separately communicable with separate ports in said discharge-tube, substantially as specified.

2. A compound faucet comprising a discharge-tube and a longitudinally-movable discharge-nozzle having ports or openings arranged to separately communicate with the body of a vessel with which said faucet is used, and with a surface-drainage pipe having communication with said discharge-tube, substantially as specified.

3. The combination, with the vessel A, of the discharge-tube E, provided with a port communicating with the lower portion of the vessel and with a lateral branch, and the surface-drainage pipe G, pivotally mounted upon said branch, substantially as specified.

4. The combination of the discharge-tube E, having ports $e^3$ $e^5$, the pipe G, pivotally connected therewith, and the nozzle F, having the port $f$, substantially as specified.

5. The combination of the pipe G, the tube E, having the ports $e^3$ $e^5$, screw-threaded portion $e^2$, and slots $e^6$ $e^7$, with the nozzle F, having the port $f$ and lug $f'$, substantially as specified.

6. The combination of the vessel A, pipe G, tube E, having the flange $e'$, ports $e^3$ $e^5$, and threaded portion $e^2$, with the nozzle F, having port $f$, and with the nut E', substantially as specified.

7. The combination of the tube E and a pipe, G, the vessels A D, nut E', washer $d'$, and the movable nozzle F, the tube, pipe, and nozzle communicating with each other, substantially as specified.

8. The discharge-tube E, provided with the screw-cap $e$, flange $e'$, thread $e^2$, ports $e^3$ $e^5$, and slots $e^6$ $e^7$ $e^8$, in combination with tube F, having lug $f'$, substantially as specified.

9. In a compound faucet, the discharge-tube provided with the screw-caps $e$ $g'$, and branch G', having a port, $g$, in combination with the pipe G, substantially as specified.

In testimony whereof I affix my signature in presence of two witnesses.

FREDRICK W. MOSELEY.

Witnesses:
 E. B. STOCKING,
 WM. S. DUVALL.